United States Patent
Suzuki et al.

(10) Patent No.: US 12,453,532 B2
(45) Date of Patent: Oct. 28, 2025

(54) ULTRASONIC WAVE GENERATION DEVICE

(71) Applicants: Niterra Co., Ltd., Nagoya (JP); THE UNIVERSITY OF TOKYO, Tokyo (JP)

(72) Inventors: Satoshi Suzuki, Nagoya (JP); Kota Yokoyama, Nagoya (JP); Ryo Suzuki, Nagoya (JP); Shinsuke Itoh, Nagoya (JP); Takashi Kasashima, Nagoya (JP); Takeshi Morita, Tokyo (JP); Shoki Ieiri, Tokyo (JP)

(73) Assignees: NITERRA CO., LTD., Nagoya (JP); THE UNIVERSITY OF TOKYO, Tokyo (JP)

( * ) Notice: Subject to any disclaimer, the term of this patent is extended or adjusted under 35 U.S.C. 154(b) by 201 days.

(21) Appl. No.: 18/495,163

(22) Filed: Oct. 26, 2023

(65) Prior Publication Data
US 2024/0138812 A1    May 2, 2024

(30) Foreign Application Priority Data

Oct. 28, 2022  (JP) ................................. 2022-172901
Jul. 18, 2023  (JP) ................................. 2023-116713

(51) Int. Cl.
    *A61B 8/00*    (2006.01)
(52) U.S. Cl.
    CPC ............ *A61B 8/445* (2013.01); *A61B 8/4483* (2013.01)
(58) Field of Classification Search
    CPC ............................. A61B 8/445; A61B 8/4483
    See application file for complete search history.

(56) References Cited

U.S. PATENT DOCUMENTS

| | | |
|---|---|---|
| 8,021,305 B2 | 9/2011 | Itoh et al. |
| 2008/0097217 A1 | 4/2008 | Itoh et al. |
| 2021/0169450 A1* | 6/2021 | Morita .................. G10K 11/28 |

FOREIGN PATENT DOCUMENTS

| | | |
|---|---|---|
| JP | 6774697 B1 | 10/2020 |
| WO | 2006/028249 A1 | 3/2006 |

* cited by examiner

*Primary Examiner* — Keith M Raymond
*Assistant Examiner* — Adam D. Kolkin
(74) *Attorney, Agent, or Firm* — Sughrue Mion, PLLC

(57) ABSTRACT

An ultrasonic wave generation device including: an ultrasonic wave generation source; an ultrasonic wave condensation part; and a waveguide. The ultrasonic wave condensation part has a first reflection surface opposed to the ultrasonic wave generation source and a second reflection surface opposed to the first reflection surface. The first reflection surface reflects the ultrasonic wave, generated from the ultrasonic wave generation source, toward the second reflection surface. The second reflection surface reflects the ultrasonic wave, which has been reflected by the first reflection surface, toward the waveguide so as to introduce the ultrasonic wave into the waveguide. The waveguide protrudes from the first reflection surface to a side opposite the second reflection surface. A recessed portion is formed from the first reflection surface to the second reflection surface side along an outer circumferential surface of the waveguide.

6 Claims, 7 Drawing Sheets

ULTRASONIC WAVE GENERATION DEVICE

BACKGROUND OF THE INVENTION

1. Field of the Invention

The present invention relates to an ultrasonic wave generation device.

2. Description of the Related Art

Conventionally, ultrasonic wave generation devices used for various purposes such as diagnosis and treatment have been known. For example, the following Patent Document 1 describes an ultrasonic wave generation device including: an ultrasonic wave generation source which generates an ultrasonic wave; an ultrasonic wave condensation part which condenses the ultrasonic wave generated by the ultrasonic wave generation source; and a waveguide which allows transmission therethrough of the ultrasonic wave condensed by the ultrasonic wave condensation part. The ultrasonic wave generated by the ultrasonic wave generation source is transmitted to the distal end of the waveguide.
[Patent Document 1] WO2006/028249

3. Problems to be Solved by the Invention

An ultrasonic wave generation device such as one described above is required to have an improved ultrasonic wave output.

SUMMARY OF THE INVENTION

The present invention has been completed in view of the above circumstance, and an object of the present invention is to provide an ultrasonic wave generation device that enables improvement in ultrasonic wave output.

The above object of the invention has been achieved by providing [1] an ultrasonic wave generation device which includes: an ultrasonic wave generation source configured to generate an ultrasonic wave; an ultrasonic wave condensation part configured to condense the ultrasonic wave generated from the ultrasonic wave generation source; and a waveguide configured to allow transmission therethrough of the ultrasonic wave condensed by the ultrasonic wave condensation part. The ultrasonic wave condensation part has a first reflection surface located to be opposed to the ultrasonic wave generation source and a second reflection surface located to be opposed to the first reflection surface. The first reflection surface reflects the ultrasonic wave, which has been generated from the ultrasonic wave generation source, toward the second reflection surface. The second reflection surface reflects the ultrasonic wave, which has been reflected by the first reflection surface, toward the waveguide so as to introduce the ultrasonic wave into the waveguide. The waveguide protrudes from the first reflection surface to a side opposite to the second reflection surface. A recessed portion is formed to be recessed from the first reflection surface to the second reflection surface side along an outer circumferential surface of the waveguide.

[2] In the ultrasonic wave generation device according to the above item [1], the recessed portion may be an air gap. An acoustic impedance of air significantly differs from acoustic impedances of the ultrasonic wave condensation part and the waveguide. Therefore, adverse influence on an ultrasonic wave that propagates to the waveguide can be effectively suppressed.

[3] In the ultrasonic wave generation device according to the above item [1], the recessed portion may be filled with a filler, and an acoustic impedance of the filler may differ from each of an acoustic impedance of the ultrasonic wave condensation part and an acoustic impedance of the waveguide. With such a configuration, adverse influence on the ultrasonic wave that propagates to the waveguide can be effectively suppressed.

[4] In the ultrasonic wave generation device according to any one of the above items [1] to [3], the waveguide and the ultrasonic wave condensation part may be formed from a same material so as to be integrated with each other. With such a configuration, as compared to a case where a waveguide and an ultrasonic wave condensation part as separate members are joined to each other, loss in an ultrasonic wave to be introduced to the waveguide can be reduced, whereby the ultrasonic wave output can be improved.

[5] In the ultrasonic wave generation device according to any one of the above items [1] to [3], the waveguide and the ultrasonic wave condensation part may be formed as separate members and joined to each other, and the recessed portion may be formed between the waveguide and the ultrasonic wave condensation part which are joined to each other. With such a configuration, since the waveguide is a member separate from the ultrasonic wave condensation part, it is possible to change the waveguide according to the purpose while using the ultrasonic wave generation source and the ultrasonic wave condensation part in common. Therefore, use of an optimal waveguide according to the purpose can be facilitated. In addition, adverse influence on the ultrasonic wave that propagates to the waveguide can be suppressed by the recessed portion, whereby the ultrasonic wave output can be improved.

[6] In the ultrasonic wave generation device according to any one of the above items [1] to [5], the ultrasonic wave generation source may have such a shape as to enclose a circumference of the second reflection surface, in a radial direction orthogonal to an opposition direction in which the ultrasonic wave generation source and the first reflection surface are opposed to each other, and the recessed portion may be located in a region on an inner circumferential side relative to a first region obtained by extending an inner circumferential edge of the ultrasonic wave generation source in the opposition direction. With such a configuration, since the recessed portion is located in the region on the inner circumferential side relative to the first region, the recessed portion does not overlap with a propagation region for the ultrasonic wave which is generated from the ultrasonic wave generation source and which heads for the first reflection surface. Therefore, the recessed portion does not hinder propagation of the ultrasonic wave generated from the ultrasonic wave generation source, whereby the ultrasonic wave output can be improved.

Advantageous Effects of the Invention

According to the present invention, the ultrasonic wave output can be improved.

DESCRIPTION OF REFERENCE NUMERALS

Figure 1:
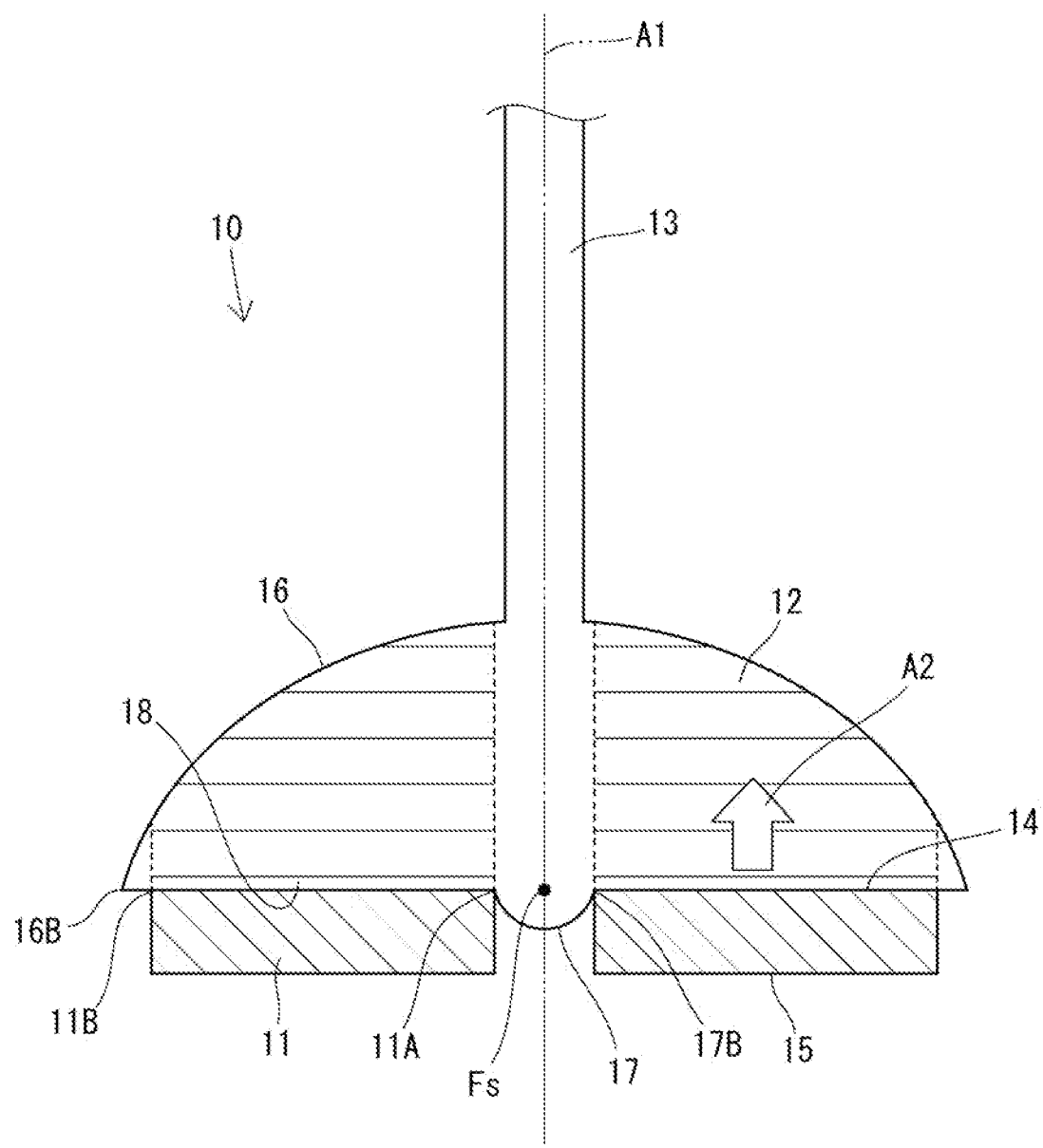
FIG. 1 is a diagram for explaining a basic configuration of an ultrasonic wave generation device and showing an image in which an ultrasonic wave generated from an ultrasonic wave generation source advances straight toward a first reflection surface.

Reference numerals used to identify various features in the drawings include the following.
- 10: ultrasonic wave generation device
- 11: ultrasonic wave generation source
- 11A: inner circumferential edge
- 11B: outer circumferential edge
- 12: ultrasonic wave condensation part
- 13: waveguide
- 13B: outer circumferential surface
- 14: first main surface
- 15: second main surface
- 16: first reflection surface
- 16B: outer circumferential edge
- 16U: upper end
- 17: second reflection surface
- 17B: outer circumferential edge
- 18: adhesion surface
- 19: introduction surface
- 19B: outer circumferential edge
- 21: introduction portion
- 22: joining portion
- 22A: adhesive
- 24: joining surface
- 25: inner circumferential surface
- 26: medium
- 27: first region
- 28: first imaginary line
- 29: second region
- 40: recessed portion
- 41: first surface
- 42: second surface
- 43: third surface
- 45: filler
- A1: axis
- A2: arrow
- B1: diameter dimension of introduction surface
- B2: diameter dimension of second reflection surface
- B3: diameter dimension of third surface
- B4: width dimension of recessed portion
- B5: diameter dimension of second region
- B6: diameter dimension of first region
- B7: depth dimension of recessed portion
- Fs: focus

DETAILED DESCRIPTION OF THE PREFERRED EMBODIMENTS

The invention will next be described in detail with reference to the drawings. However, the present invention should not be construed as being limited thereto.

Embodiment 1

Hereinafter, embodiment 1 of the present invention will be described in detail with reference to FIG. 1 to FIG. 3. An ultrasonic wave generation device 10 in the present embodiment is used for an ultrasonograph, an ultrasonic treatment device, a cavitation generator, or the like.

Firstly, a basic configuration of the ultrasonic wave generation device 10 will be described. As shown in FIG. 1, the ultrasonic wave generation device 10 includes an ultrasonic wave generation source 11, an ultrasonic wave condensation part 12, and a waveguide 13. The ultrasonic wave generation source 11 generates an ultrasonic wave. The ultrasonic wave condensation part 12 condenses the ultrasonic wave generated from the ultrasonic wave generation source 11. The waveguide 13 allows transmission therethrough of the ultrasonic wave condensed by the ultrasonic wave condensation part 12. The ultrasonic wave transmitted through the waveguide 13 is applied to an object. The object is not particularly limited and may be, for example, the inside of a living body. The ultrasonic wave applied to the object is reflected by the object and returned to the inside of the waveguide 13 as an ultrasonic wave carrying image information about the object. The ultrasonic wave carrying the image information about the object is returned to the ultrasonic wave generation source 11 through the waveguide 13 and the ultrasonic wave condensation part 12. An electric signal based on the ultrasonic wave carrying the image information is received by a signal transmission/reception circuit, and the image information included in the received signal is displayed on a signal display device. As a technology for displaying an image on the basis of such an ultrasonic wave including image information, a known technology employed for an ultrasonograph or the like can be employed.

The ultrasonic wave generation source 11 is, for example, a piezoelectric element. The ultrasonic wave generation source 11 is formed in the shape of a plate having a predetermined thickness dimension. The ultrasonic wave generation source 11 has a first main surface 14 and a second main surface 15 on a side opposite to the first main surface 14. Electrodes (not shown) are disposed on the first main surface 14 and the second main surface 15. The first main surface 14 is adhered to the ultrasonic wave condensation part 12 by using an adhesive (not shown).

The ultrasonic wave generation source 11 generates an ultrasonic wave when receiving an electric signal from the signal transmission/reception circuit (not shown). The ultrasonic wave generated from the ultrasonic wave generation source 11 is a plane wave that advances straight in a direction indicated by an arrow A2 as shown in FIG. 1. The arrow A2 indicates the advancing direction of the ultrasonic wave generated from the ultrasonic wave generation source 11. The arrow A2 is parallel to an axis A1. The ultrasonic wave generation source 11 generates an ultrasonic wave having, for example, a frequency equal to or higher than 30 kHz. Hereinafter, description will be made while, regarding each constituent member, the direction indicated by the arrow A2 in FIG. 1 is defined as an upward direction, and the direction opposite thereto is defined as a downward direction.

The ultrasonic wave condensation part 12 has a first reflection surface 16 and a second reflection surface 17. The first reflection surface 16 is located to be opposed to the ultrasonic wave generation source 11. An opposition direction in which the first reflection surface 16 and the ultrasonic wave generation source 11 are opposed to each other is parallel to the direction in which the axis A1 extends. The first reflection surface 16 is a paraboloid protruding to the upper side (the side opposite to the ultrasonic wave generation source 11) as seen from outside of the ultrasonic wave condensation part 12. The first reflection surface 16 has a recessed shape as seen from inside of the ultrasonic wave condensation part 12. A center portion of the first reflection surface 16 is located above an outer circumferential edge 16B of the first reflection surface 16. The first reflection surface 16 is a paraboloid of revolution about the axis A1.

The second reflection surface 17 is located to be opposed to the first reflection surface 16. In the above embodiment, the second reflection surface 17 is a paraboloid protruding to the lower side (the side opposite to the first reflection surface 16) as seen from outside of the ultrasonic wave condensation part 12. The second reflection surface 17 has a recessed shape as seen from inside of the ultrasonic wave condensation part 12. A center portion of the second reflection surface 17 is located below an outer circumferential edge 17B of the second reflection surface 17. The second reflection surface 17 is a paraboloid of revolution about the axis A1.

Figure 2:
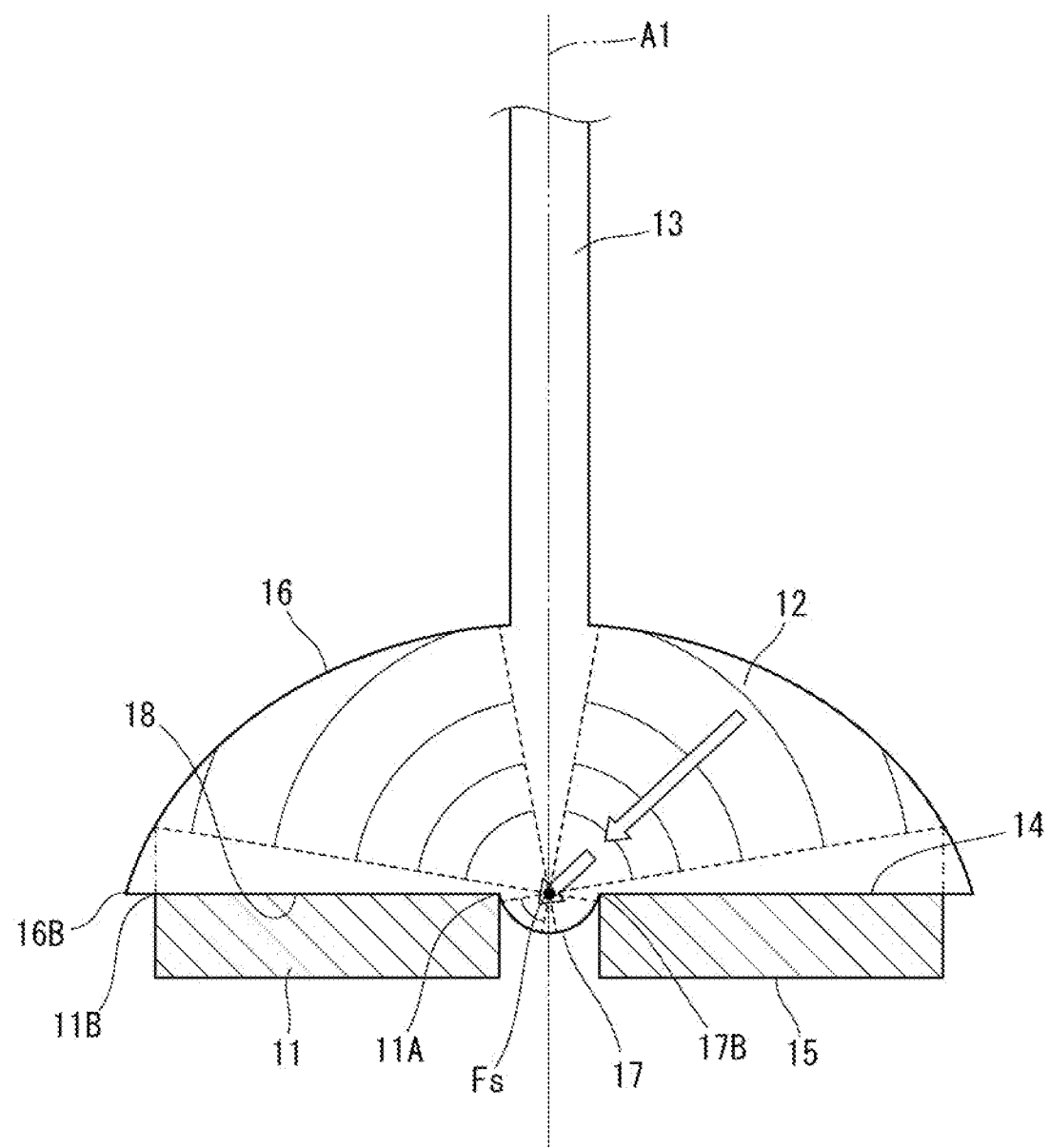
FIG. 2 is a diagram for explaining the basic configuration of the ultrasonic wave generation device and showing an image in which the ultrasonic wave reflected by the first reflection surface heads for and is condensed at a focus.
Figure 3:
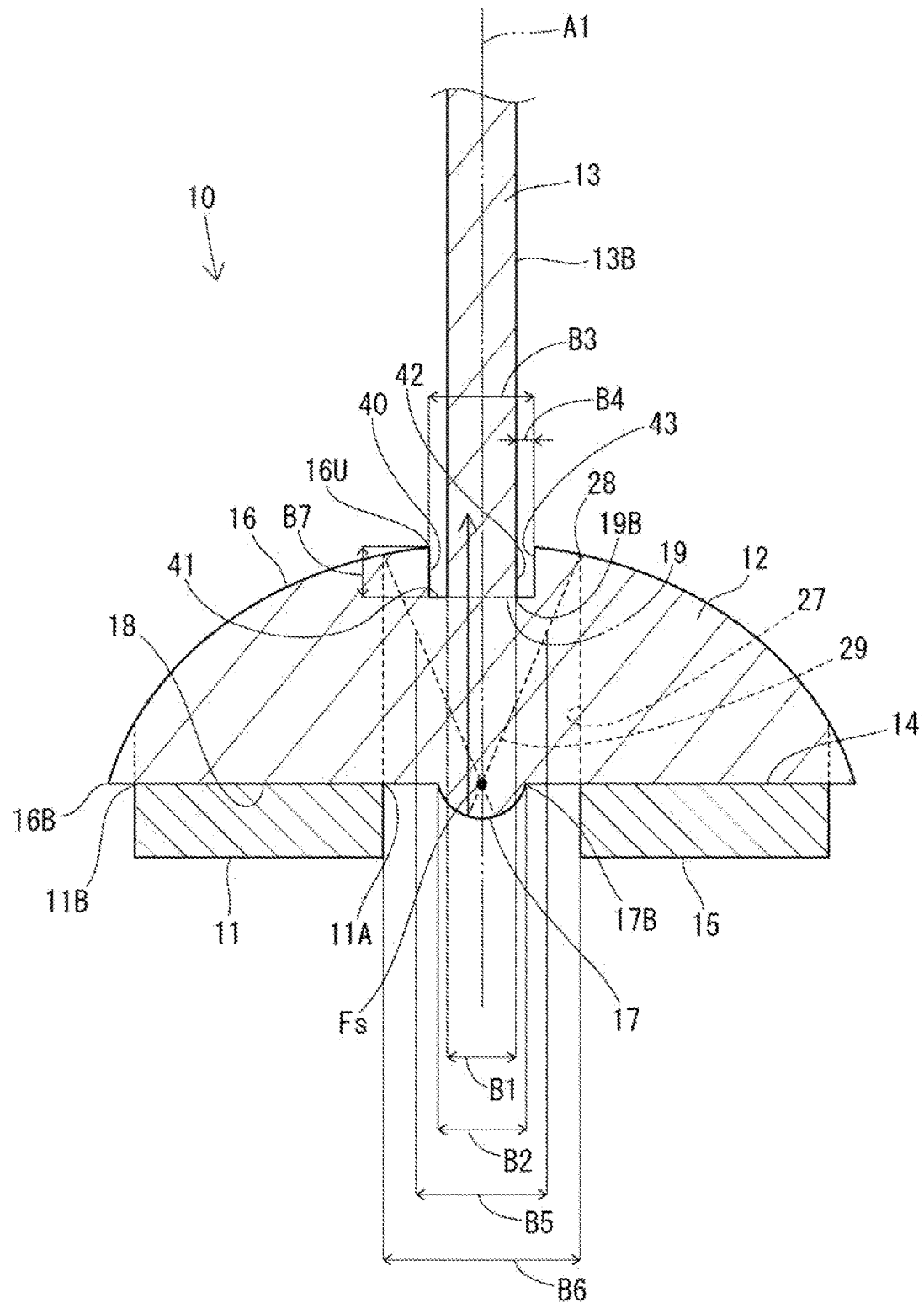
FIG. 3 is a schematic cross-sectional view showing an ultrasonic wave generation device in embodiment 1.

The ultrasonic wave generated from the ultrasonic wave generation source 11 is reflected by the first reflection surface 16 so as to head for and be condensed at a focus Fs for the first reflection surface 16, as shown in FIG. 2. The ultrasonic wave having passed through the focus Fs is reflected by the second reflection surface 17 so as to head for and be condensed at a focus Fs for the second reflection surface 17. The focus Fs for the second reflection surface 17 is identical to the focus Fs for the first reflection surface 16. The ultrasonic wave reflected by the second reflection surface 17 and having passed through the focus Fs is introduced into the waveguide 13 as a plane wave. The focus Fs is located on the axis A1.

Next, the details of the ultrasonic wave generation device 10 will be described. The ultrasonic wave generation source 11 has an annular shape about the axis A1. The ultrasonic wave generation source 11 encloses a circumference of the second reflection surface 17. The first main surface 14 of the ultrasonic wave generation source 11 is located at the same position in the up-down direction as that of the outer circumferential edge 17B of the second reflection surface 17. An inner circumferential edge 11A of the ultrasonic wave generation source 11 is apart from the outer circumferential edge 17B of the second reflection surface 17 outward in a radial direction orthogonal to the axis A1. An outer circumferential edge 11B of the ultrasonic wave generation source 11 is apart from the outer circumferential edge 16B of the first reflection surface 16 inward in the radial direction orthogonal to the axis A1. The outer circumferential edge 16B of the first reflection surface 16 and the outer circumferential edge 17B of the second reflection surface 17 have circular shapes that are concentric about the axis A1 as seen from below. The inner circumferential edge 11A and the outer circumferential edge 11B of the ultrasonic wave generation source 11 are the inner circumferential edge and the outer circumferential edge of the first main surface 14.

The ultrasonic wave condensation part 12 is formed of a solid metal (for example, duralumin). The ultrasonic wave condensation part 12 has the shape of a dome forming a portion of a sphere. The ultrasonic wave condensation part 12 has an adhesion surface 18 adhered to the ultrasonic wave generation source 11. The adhesion surface 18 spreads, outward in the radial direction orthogonal to the axis A1, from the outer circumferential edge 17B of the second reflection surface 17 to the outer circumferential edge 16B of the first reflection surface 16. The adhesion surface 18 is a flat surface orthogonal to the axis A1. The adhesion surface 18 has an annular shape about the axis A1 so as to enclose the circumference of the second reflection surface 17. The second reflection surface 17 is formed below the adhesion surface 18.

The waveguide 13 and the ultrasonic wave condensation part 12 are formed from a same material so as to be integrated with each other. The waveguide 13 protrudes upward along the axis A1 from the center portion of the first reflection surface 16. A lower end surface of the waveguide 13 is an introduction surface 19. The introduction surface 19 is located below an upper end 16U of the first reflection surface 16 owing to a recessed portion 40 described later. The ultrasonic wave is introduced from the introduction surface 19 into the waveguide 13. The introduction surface 19 is orthogonal to the axis A1.

The introduction surface 19 has a circular shape about the axis A1. A diameter dimension B1, in a direction orthogonal to the axis A1, of the introduction surface 19 is smaller than a diameter dimension B2, in the direction orthogonal to the axis A1, of the second reflection surface 17. An outer circumferential edge 19B of the introduction surface 19 is located inward of the outer circumferential edge 17B of the second reflection surface 17 in the direction orthogonal to the axis A1.

The recessed portion 40 is formed between the waveguide 13 and the first reflection surface 16. The recessed portion 40 is recessed from the first reflection surface 16 to the lower side (second reflection surface 17 side) along an outer circumferential surface 13B of the waveguide 13. The recessed portion 40 is opened to the upper side. The recessed portion 40 has an annular shape so as to extend along the outer circumferential surface 13B of the waveguide 13 and so as to be contiguous with the entire circumference of the outer circumferential surface 13B as seen from above. The recessed portion 40 is filled with air. Owing to the presence of the recessed portion 40, the peak of the output of an ultrasonic wave passing through the waveguide 13 is several times as high as that in a case where the recessed portion 40 is not present.

The recessed portion 40 has a first surface 41, a second surface 42, and a third surface 43. The first surface 41 is a lower surface of the recessed portion 40. The second surface 42 is an inner surface of the recessed portion 40 in the radial direction about the axis A1. The second surface 42 is a portion extending downward from the same height position as that of the upper end 16U of the first reflection surface 16. The third surface 43 is an outer surface of the recessed portion 40 in the radial direction about the axis A1.

The first surface 41 is a flat surface orthogonal to the axis A1. The first surface 41 has an annular shape about the axis A1 as seen from above. The second surface 42 and the third surface 43 each have a cylindrical shape about the axis A1. The second surface 42 extends continuously from the outer circumferential surface 13B of the waveguide 13 to the first surface 41. The third surface 43 is formed at a position apart from the outer circumferential surface 13B of the waveguide 13 outward in the radial direction. An upper end of the third surface 43 coincides with the upper end 16U of the first reflection surface 16. A diameter dimension B3 of the third surface 43 in the direction orthogonal to the axis A1 is smaller than a diameter dimension B6 of a first region 27 described later in the direction orthogonal to the axis A1. The diameter dimension B3 of the third surface 43 is unchanging from the upper end to a lower end of the third surface 43.

A width dimension B4 of the recessed portion 40 is unchanging from an upper end to a lower end thereof. The width dimension B4 of the recessed portion 40 is the distance, in the direction orthogonal to the axis A1, between the second surface 42 and the third surface 43. The width dimensions B4, of the recessed portion 40, at the upper end and the lower end of the recessed portion 40 are equal to each other.

A depth dimension B7 of the recessed portion 40 is preferably large to a certain extent. The depth dimension B7 of the recessed portion 40 is the distance, in a direction parallel to the axis A1, from the upper end to the lower end of the recessed portion 40. The upper end of the recessed portion 40 is the upper end of the third surface 43. The lower end of the recessed portion 40 coincides with lower ends of the second surface 42 and the third surface 43. The depth dimension B7 of the recessed portion 40 may be set to an optimal dimension on the basis of the speed of sound and the frequency in the material forming the ultrasonic wave condensation part 12, the thickness of the waveguide 13, and the like. The depth dimension B7 of the recessed portion 40 may be, for example, not smaller than 0.5 mm. The depth dimension B7 of the recessed portion 40 is set to such a dimension that the recessed portion 40 does not reach a second region 29 described later.

The recessed portion 40 is located so as not to overlap with propagation regions for ultrasonic waves. Specifically, the recessed portion 40 overlaps with neither a propagation region for an ultrasonic wave that is generated from the ultrasonic wave generation source 11 and that heads for the first reflection surface 16 nor a propagation region for an ultrasonic wave that is condensed at the focus Fs from the first reflection surface 16.

The propagation region for the ultrasonic wave that is generated from the ultrasonic wave generation source 11 and that heads for the first reflection surface 16 is a region on an outer circumferential side relative to the first region 27. The first region 27 is a region obtained by extending the inner circumferential edge 11A of the ultrasonic wave generation source 11 in the opposition direction in which the ultrasonic wave generation source 11 and the first reflection surface 16 are opposed to each other. The first region 27 is formed by all of straight lines that pass through the inner circumferential edge 11A of the ultrasonic wave generation source 11 and that are parallel to the axis A1. The first region 27 has a cylindrical shape about the axis A1.

The recessed portion 40 is located on an inner circumferential side relative to the first region 27. The entire recessed portion 40 is apart inward from the first region 27.

The propagation region for the ultrasonic wave that is condensed at the focus Fs from the first reflection surface 16 is a region on the outer circumferential side relative to the second region 29. The second region 29 is a region extending from a first imaginary line 28 to the focus Fs for the first reflection surface 16. The second region 29 is formed by line segments that pass through all of respective points on the first imaginary line 28 and the focus Fs. The first imaginary line 28 is a line at which the first region 27 and the first reflection surface 16 intersect. The first imaginary line 28 is a line obtained by projecting the inner circumferential edge 11A of the ultrasonic wave generation source 11 onto the first reflection surface 16 parallelly to the axis A1. The first imaginary line 28 has a circular shape about the axis A1. The second region 29 has, in a side view, a right circular conical shape about the axis A1. A diameter dimension B5 of the second region 29 in the direction orthogonal to the axis A1 gradually increases from the lower side toward the upper side.

The recessed portion 40 is located at an upper portion of a region on the inner circumferential side relative to the second region 29. The entire recessed portion 40 is apart from the second region 29. The diameter dimension B3 of the third surface 43 of the recessed portion 40 is smaller than the diameter dimension B5 of the second region 29 at the upper side relative to the first surface 41.

The following advantageous effects are exhibited according to the embodiment configured as described above. The ultrasonic wave generation device 10 includes the ultrasonic wave generation source 11, the ultrasonic wave condensation part 12, and the waveguide 13. The ultrasonic wave generation source 11 generates an ultrasonic wave. The ultrasonic wave condensation part 12 condenses the ultrasonic wave generated from the ultrasonic wave generation source 11. The waveguide 13 allows transmission therethrough of the ultrasonic wave condensed by the ultrasonic wave condensation part 12. The ultrasonic wave condensation part 12 has the first reflection surface 16 and the second reflection surface 17. The first reflection surface 16 is located to be opposed to the ultrasonic wave generation source 11. The second reflection surface 17 is located to be opposed to the first reflection surface 16. The first reflection surface 16 reflects the ultrasonic wave, which has been generated from the ultrasonic wave generation source 11, toward the second reflection surface 17. The second reflection surface 17 reflects the ultrasonic wave, which has been reflected by the first reflection surface 16, toward the waveguide 13 so as to introduce the ultrasonic wave into the waveguide 13. The waveguide 13 protrudes from the first reflection surface 16 to a side opposite to the second reflection surface 17. The recessed portion 40 is formed between the waveguide 13 and the first reflection surface 16 to be recessed from the first reflection surface 16 to the second reflection surface 17 side along the outer circumferential surface 13B of the waveguide 13. With this configuration, the ultrasonic wave output can be improved. Studies made by the present inventor have resulted in an observation that this improvement is attributed to: the fact that a wave reflected on the second reflection surface 17 can enter the waveguide 13 in a state where the wave has been spread to a small extent; and the fact that it is possible to prevent a part of the wave reflected on the second reflection surface 17 from being reflected again by the first reflection surface 16 and interfering with the wave reflected on the second reflection surface 17.

The recessed portion 40 is an air gap. An acoustic impedance of air significantly differs from acoustic impedances of the ultrasonic wave condensation part 12 and the waveguide 13. Therefore, adverse influence on an ultrasonic wave that propagates to the waveguide 13 can be effectively suppressed.

The waveguide 13 and the ultrasonic wave condensation part 12 are formed from a same material so as to be integrated with each other. With this configuration, as compared to a case where a waveguide and an ultrasonic wave condensation part as separate members are joined to each other, loss in an ultrasonic wave to be introduced to the waveguide 13 can be reduced, whereby the ultrasonic wave output can be improved.

The ultrasonic wave generation source 11 has such a shape as to enclose the circumference of the second reflection surface 17, in the radial direction orthogonal to the opposition direction in which the ultrasonic wave generation source 11 and the first reflection surface 16 are opposed to each other. The recessed portion 40 is located in the region on the inner circumferential side relative to the first region 27 obtained by extending the inner circumferential edge 11A of the ultrasonic wave generation source 11 in the opposition direction. The recessed portion 40 is located in the region on the inner circumferential side relative to the first region 27, and thus, does not overlap with the propagation region for the ultrasonic wave that is generated from the ultrasonic wave generation source 11 and that heads for the first reflection surface 16. Therefore, the recessed portion 40 does not hinder propagation of the ultrasonic wave generated from the ultrasonic wave generation source 11, whereby the ultrasonic wave output can be improved.

Embodiment 2

Figure 4:
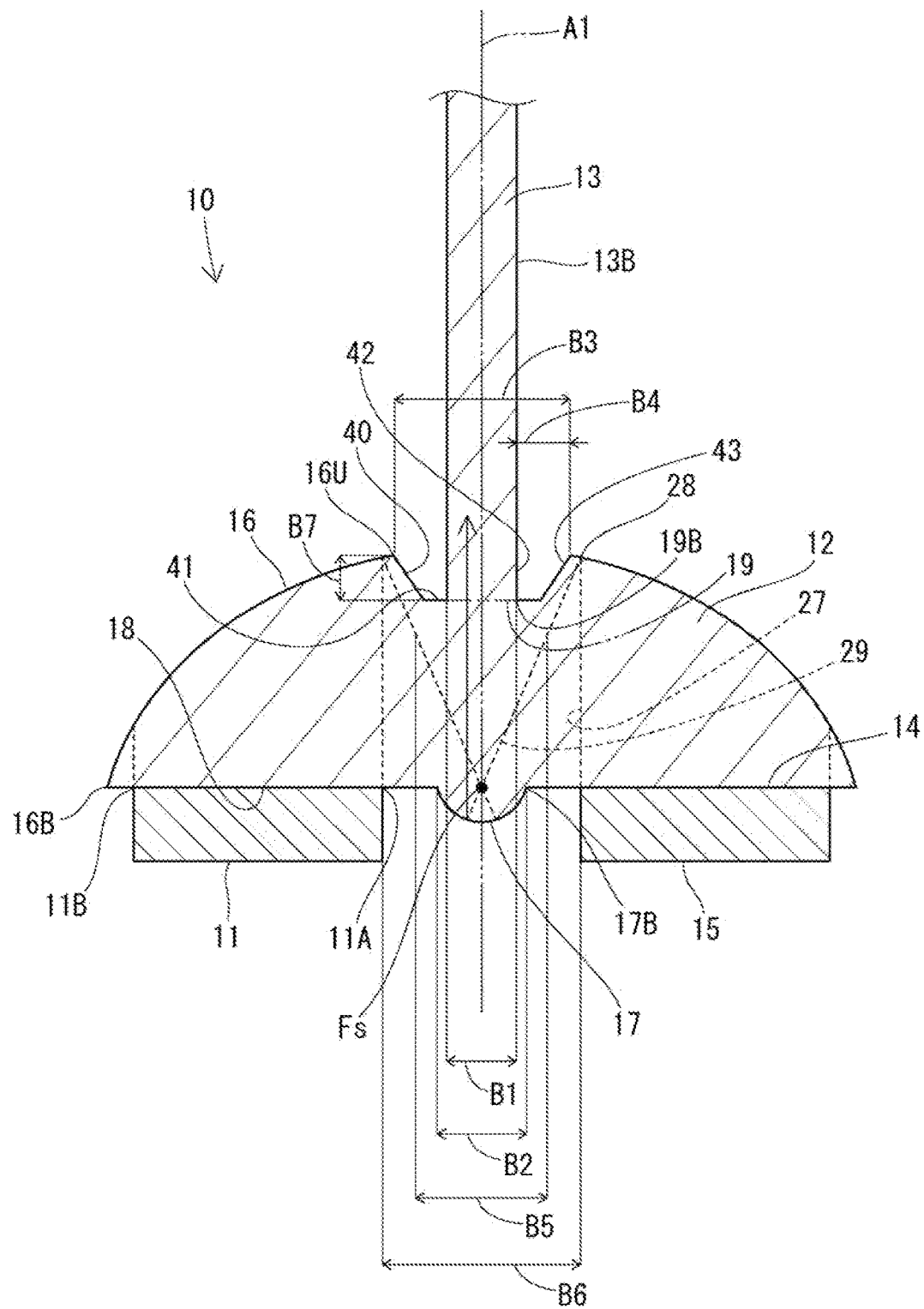
FIG. 4 is a schematic cross-sectional view showing an ultrasonic wave generation device in embodiment 2.

Next, an ultrasonic wave generation device 10 according to embodiment 2 of the present invention will be described with reference to FIG. 4. The ultrasonic wave generation device 10 of the present embodiment differs from that of embodiment 1 in that the third surface 43 of the recessed portion 40 is tilted. The same constituents as those in embodiment 1 are denoted by the same reference characters, and repetitive descriptions thereof are omitted.

Similar to embodiment 1, the ultrasonic wave generation device 10 according to the present embodiment includes: the ultrasonic wave generation source 11 which generates an ultrasonic wave; the ultrasonic wave condensation part 12 which condenses the ultrasonic wave generated from the ultrasonic wave generation source 11; and the waveguide 13 which allows transmission therethrough of the ultrasonic wave condensed by the ultrasonic wave condensation part 12. The recessed portion 40 is formed between the waveguide 13 and the first reflection surface 16 to be recessed from the first reflection surface 16 to the lower side along the outer circumferential surface 13B of the waveguide 13.

Similar to embodiment 1, the recessed portion 40 has the first surface 41, the second surface 42, and a third surface 43. The third surface 43 is a tilted surface that approaches the waveguide 13 as it goes from the upper end toward the lower end of the third surface 43. The diameter dimension B3 of the third surface 43 gradually decreases from the upper end toward the lower end of the third surface 43. The width dimension B4 of the recessed portion 40 gradually decreases from the upper end toward the lower end thereof. Similar to embodiment 1, the recessed portion 40 is located so as not to overlap with the propagation regions for ultrasonic waves.

In the present embodiment as described above, similar to embodiment 1, the recessed portion 40 is formed between the waveguide 13 and the first reflection surface 16, whereby adverse influence on the ultrasonic wave that propagates to the waveguide 13 can be suppressed, and thus the ultrasonic wave output can be improved.

Embodiment 3

Figure 5:
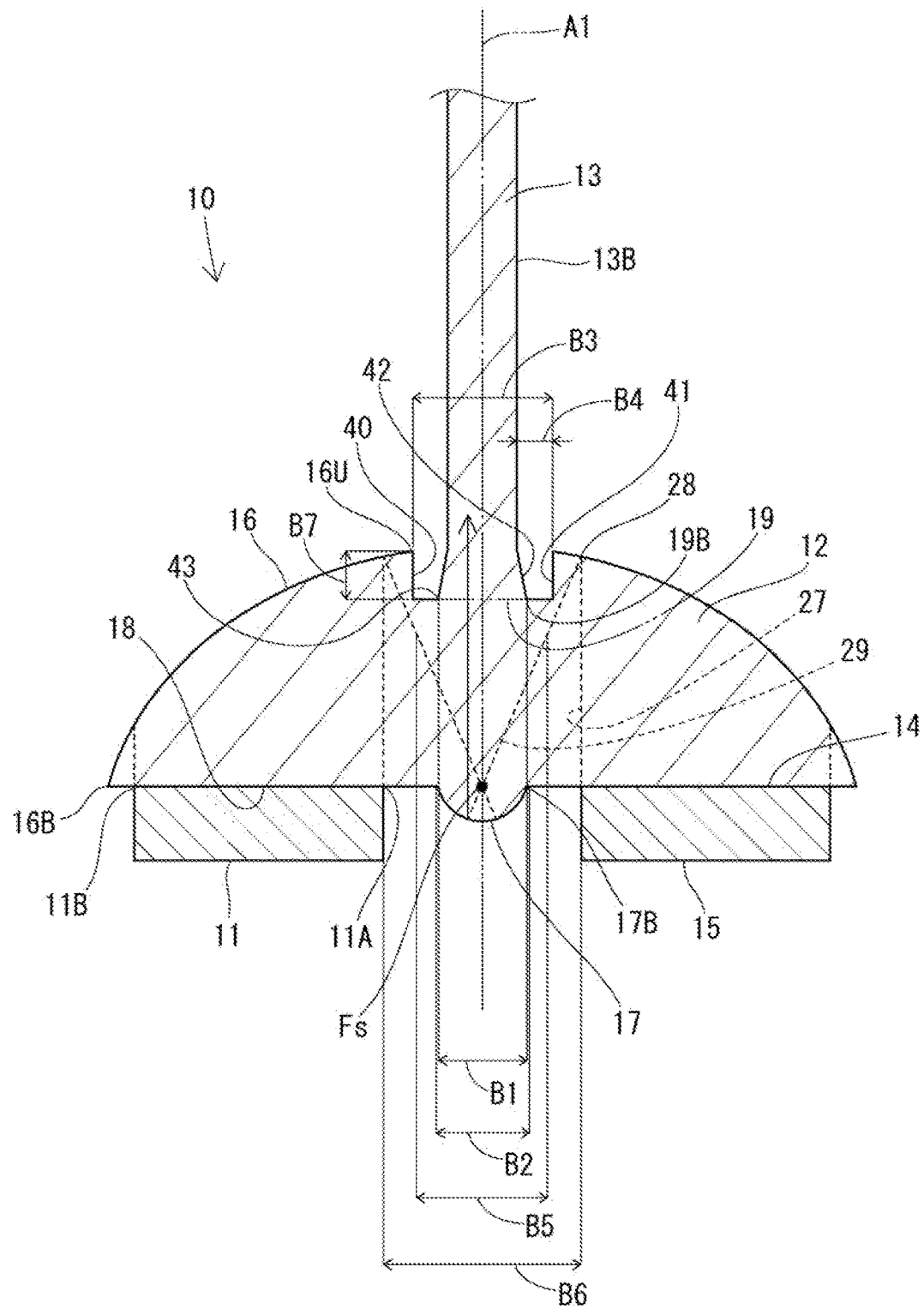
FIG. 5 is a schematic cross-sectional view showing an ultrasonic wave generation device in embodiment 3.

Next, an ultrasonic wave generation device 10 according to embodiment 3 of the present invention will be described with reference to FIG. 5. The ultrasonic wave generation device 10 of the present embodiment differs from that of embodiment 1 in that the second surface 42 of the recessed portion 40 is tilted. The same constituents as those in embodiment 1 are denoted by the same reference characters, and repetitive descriptions thereof are omitted.

Similar to embodiment 1, the ultrasonic wave generation device 10 according to the present embodiment includes: the ultrasonic wave generation source 11 which generates an ultrasonic wave; the ultrasonic wave condensation part 12 which condenses the ultrasonic wave generated from the ultrasonic wave generation source 11; and the waveguide 13 which allows transmission therethrough of the ultrasonic wave condensed by the ultrasonic wave condensation part 12. The recessed portion 40 is formed between the waveguide 13 and the first reflection surface 16 to be recessed from the first reflection surface 16 to the lower side along the outer circumferential surface 13B of the waveguide 13.

Similar to embodiment 1, the recessed portion 40 has the first surface 41, a second surface 42, and the third surface 43. The second surface 42 is tilted in such a direction that the thickness of the waveguide 13 increases from the upper end toward the lower end of the second surface 42. The width dimension B4 of the recessed portion 40 gradually decreases from the upper end toward the lower end thereof. The diameter dimension B1 of the introduction surface 19 is larger than the thickness of the waveguide 13 at a portion located on the upper side relative to the first reflection surface 16. Similar to embodiment 1, the recessed portion 40 is located so as not to overlap with the propagation regions for ultrasonic waves.

In the present embodiment as described above, similar to embodiment 1, the recessed portion 40 is formed between the waveguide 13 and the first reflection surface 16, whereby adverse influence on the ultrasonic wave that propagates to the waveguide 13 can be suppressed, and thus the ultrasonic wave output can be improved.

Embodiment 4

Figure 6:
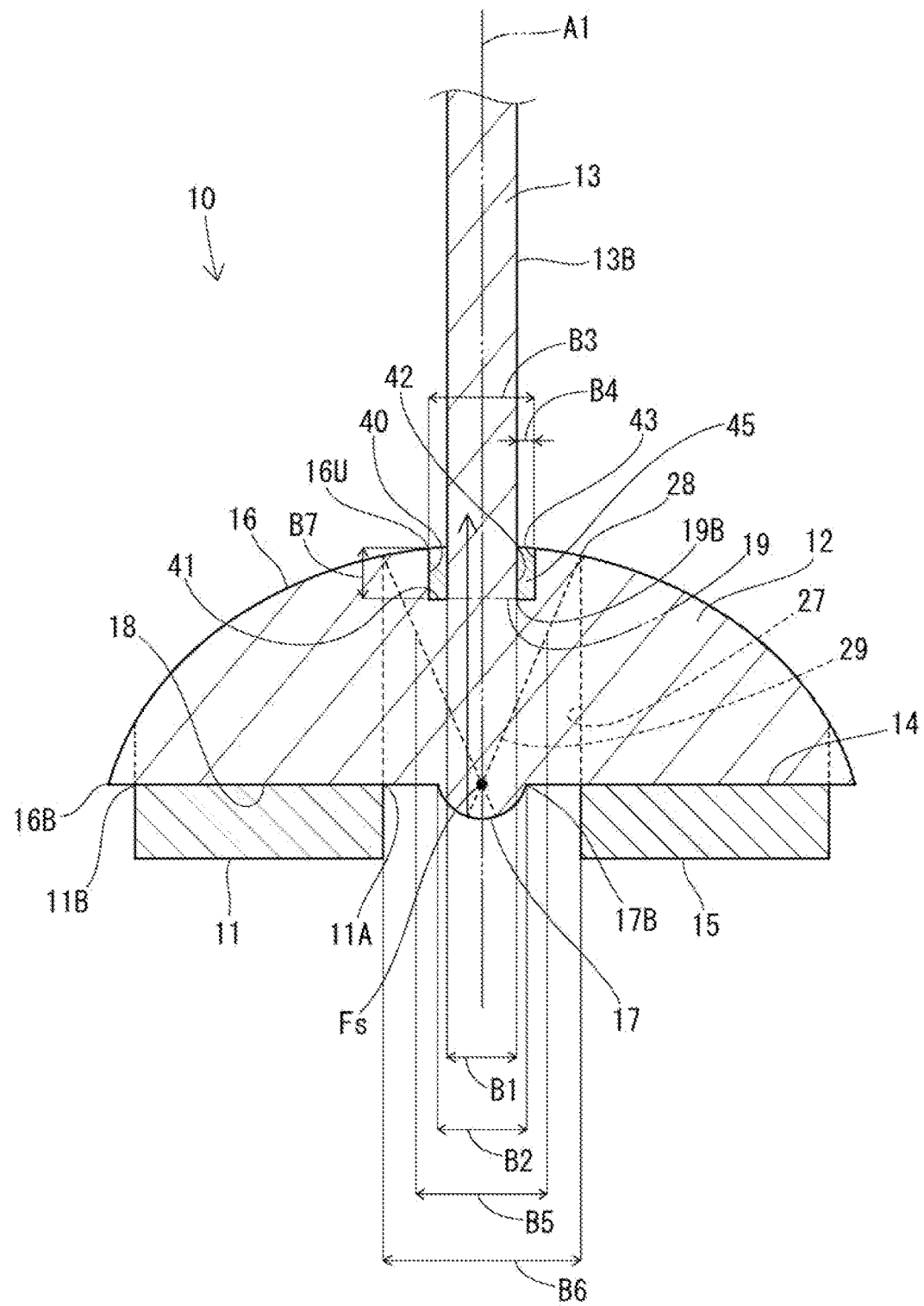
FIG. 6 is a schematic cross-sectional view showing an ultrasonic wave generation device in embodiment 4.

Next, an ultrasonic wave generation device 10 according to embodiment 4 of the present invention will be described with reference to FIG. 6. The ultrasonic wave generation device 10 of the present embodiment differs from that of embodiment 1 in that the recessed portion 40 is filled with a filler 45. The same constituents as those in embodiment 1 are denoted by the same reference characters, and repetitive descriptions thereof are omitted.

Similar to embodiment 1, the ultrasonic wave generation device 10 according to the present embodiment includes: the ultrasonic wave generation source 11 which generates an ultrasonic wave; the ultrasonic wave condensation part 12 which condenses the ultrasonic wave generated from the ultrasonic wave generation source 11; and the waveguide 13 which allows transmission therethrough of the ultrasonic wave condensed by the ultrasonic wave condensation part 12. The recessed portion 40 is formed between the waveguide 13 and the first reflection surface 16 to be recessed from the first reflection surface 16 to the lower side along the outer circumferential surface 13B of the waveguide 13.

The recessed portion 40 is filled with the filler 45. The filler 45 fills the recessed portion 40 over the entire circumference of the recessed portion 40 from the lower end to the upper end thereof without leaving any space. An acoustic impedance of the filler 45 and the acoustic impedance of the ultrasonic wave condensation part 12 differ from each other. The acoustic impedance of the filler 45 and the acoustic impedance of the waveguide 13 differ from each other.

The filler 45 is formed of a synthetic resin. As the filler 45, silicon rubber or the like may be used. The material of the filler 45 may be made into slurry to fill the recessed portion 40. The filler 45 may be formed by causing a material in liquid form or gel form to flow into the recessed portion 40. The filler 45 may be formed by fitting an individual component into the recessed portion 40. For example, the filler 45 may be a component in the form of a hollow ring.

In the present embodiment as described above, similar to embodiment 1, the recessed portion 40 is formed between the waveguide 13 and the first reflection surface 16, whereby adverse influence on the ultrasonic wave that propagates to the waveguide 13 can be suppressed, and thus the ultrasonic wave output can be improved.

The recessed portion 40 is filled with the filler 45. The acoustic impedance of the filler 45 differs from each of the acoustic impedance of the ultrasonic wave condensation part 12 and the acoustic impedance of the waveguide 13. With this configuration, adverse influence on the ultrasonic wave that propagates to the waveguide 13 can be effectively suppressed.

Embodiment 5

Figure 7:
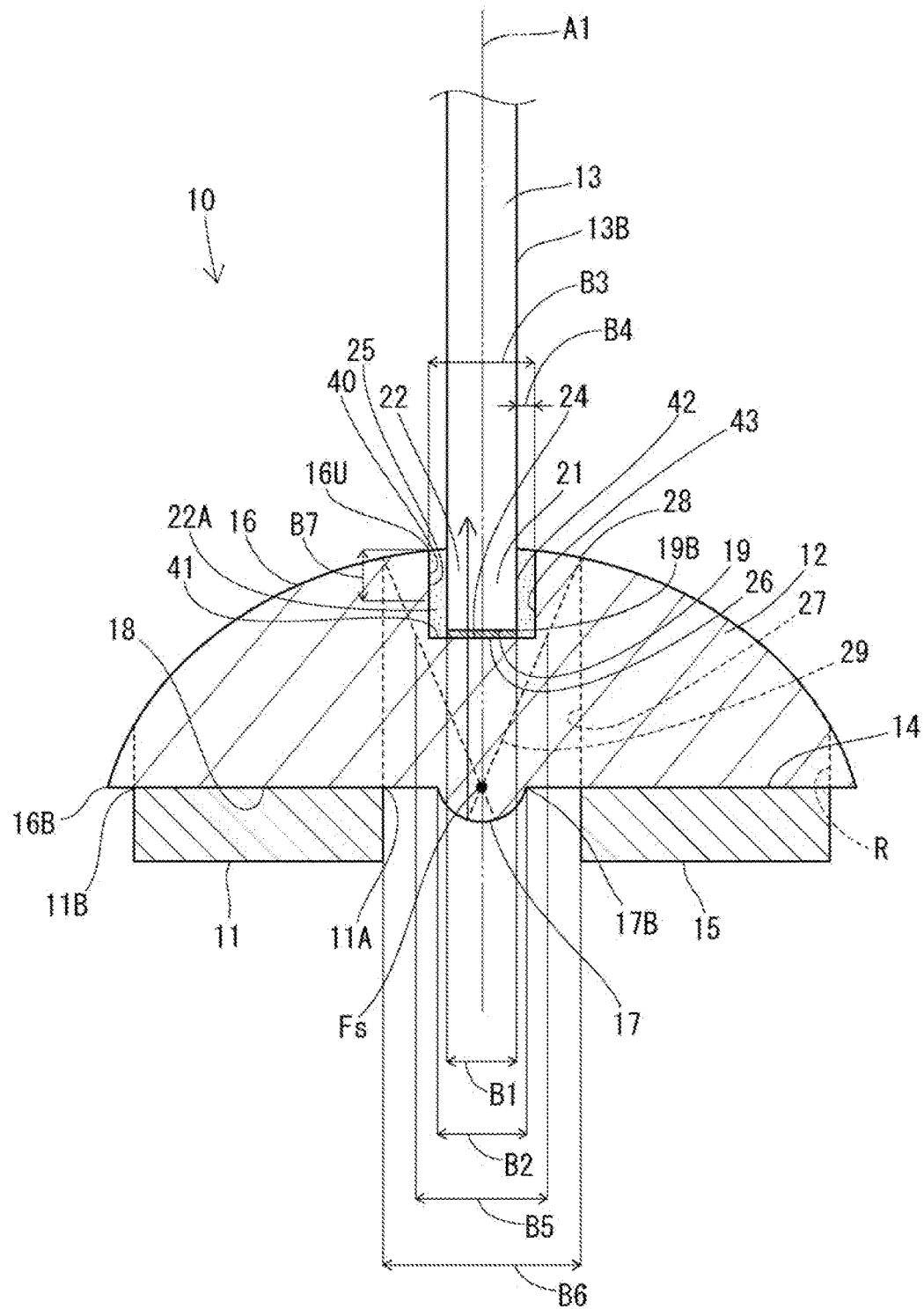
FIG. 7 is a schematic cross-sectional view showing an ultrasonic wave generation device in embodiment 5.

Next, an ultrasonic wave generation device 10 according to embodiment 5 of the present invention will be described with reference to FIG. 7. The ultrasonic wave generation device 10 of the present embodiment differs from that of embodiment 1 in that: the waveguide 13 and the ultrasonic wave condensation part 12 are formed as separate members; and the waveguide 13 and the ultrasonic wave condensation part 12 are joined to each other at a joining portion 22. The same constituents as those in embodiment 1 are denoted by the same reference characters, and repetitive descriptions thereof are omitted.

Similar to embodiment 1, the ultrasonic wave generation device 10 according to the present embodiment includes: the ultrasonic wave generation source 11 which generates an ultrasonic wave; the ultrasonic wave condensation part 12 which condenses the ultrasonic wave generated from the ultrasonic wave generation source 11; and the waveguide 13 which allows transmission therethrough of the ultrasonic wave condensed by the ultrasonic wave condensation part 12. The recessed portion 40 is formed between the waveguide 13 and the first reflection surface 16 to be recessed from the first reflection surface 16 to the lower side along the outer circumferential surface 13B of the waveguide 13. Similar to embodiment 1, the recessed portion 40 has the first surface 41, the second surface 42, and the third surface 43, and is located so as not to overlap with the propagation regions for ultrasonic waves.

The waveguide 13 is a member separate from the ultrasonic wave condensation part 12. The waveguide 13 has the shape of a solid pillar. The waveguide 13 is joined to the ultrasonic wave condensation part 12 at the joining portion 22. The joining portion 22 is formed by recessing the center portion of the first reflection surface 16. The joining portion 22 has a joining surface 24 and an inner circumferential surface 25.

The joining surface 24 is a bottom surface of the joining portion 22. The joining surface 24 is a flat surface orthogonal to the axis A1. The joining surface 24 has a circular shape about the axis A1. The inner circumferential surface 25 has a cylindrical shape about the axis A1.

A lower end portion of the waveguide 13 is an introduction portion 21. The introduction portion 21 includes an introduction surface 19. The introduction portion 21 is inserted in the joining portion 22. The introduction portion 21 and the joining portion 22 are fixed to each other with an adhesive 22A. For the adhesive 22A, a material that does not easily soften or melt owing to heat is used. The introduction surface 19 and the joining surface 24 are opposed to each other in the joining portion 22. The gap between the introduction surface 19 and the joining surface 24 is filled with a medium 26 which allows propagation therethrough of an ultrasonic wave. Consequently, an air gap can be prevented from being formed between the introduction surface 19 and the joining surface 24.

The recessed portion 40 is formed between the introduction portion 21 and the inner circumferential surface 25 of the joining portion 22 in a state where the waveguide 13 and the ultrasonic wave condensation part 12 are joined to each other. A portion, of the joining surface 24, that encloses the introduction surface 19 forms the first surface 41 of the recessed portion 40. The outer circumferential surface of the introduction portion 21 forms the second surface 42 of the recessed portion 40. The inner circumferential surface 25 of the joining portion 22 forms the third surface 43 of the recessed portion 40.

The diameter dimension B3 of the third surface 43 is equal to a diameter dimension of the inner circumferential surface 25 in the direction orthogonal to the axis A1. The width dimension B4 of the recessed portion 40 is equal to the distance, in the direction orthogonal to the axis A1, between the outer circumferential surface of the introduction portion 21 and the inner circumferential surface 25 of the joining portion 22.

The adhesive 22A is a filler for filling the recessed portion 40. The adhesive 22A fills the recessed portion 40 over the entire circumference of the recessed portion 40 from the lower end to the upper end thereof without leaving any space. An acoustic impedance of the adhesive 22A and the acoustic impedance of the ultrasonic wave condensation part 12 differ from each other. The acoustic impedance of the adhesive 22A and the acoustic impedance of the waveguide 13 differ from each other.

In the present embodiment as described above, similar to embodiment 1, the recessed portion 40 is formed between the waveguide 13 and the first reflection surface 16, whereby adverse influence on the ultrasonic wave that propagates to the waveguide 13 can be suppressed, and thus the ultrasonic wave output can be improved.

The waveguide 13 and the ultrasonic wave condensation part 12 are formed as separate members and joined to each other. The recessed portion 40 is formed between the waveguide 13 and the ultrasonic wave condensation part 12 which are joined to each other. With this configuration, since the waveguide 13 is a member separate from the ultrasonic wave condensation part 12, it is possible to change the waveguide 13 according to the purpose while using the ultrasonic wave generation source 11 and the ultrasonic wave condensation part 12 in common. Therefore, use of an optimal waveguide 13 according to the purpose can be facilitated. In addition, adverse influence on the ultrasonic wave that propagates to the waveguide 13 can be suppressed by the recessed portion 40, whereby the ultrasonic wave output can be improved.

Other Embodiments

Embodiments of the present invention are not limited to those described in the above explanations and with reference to the drawings, and, for example, the following embodiments are also included in the technical scope of the present invention.

(1) In each of the above embodiments, the first reflection surface 16 and the second reflection surface 17 are paraboloids. Without limitation thereto, both or one of the first reflection surface and the second reflection surface does not have to be a paraboloid in an exact sense and may have a shape with which the reflection surface can be regarded as an approximate paraboloid. In other words, both or one of the first reflection surface and the second reflection surface only has to be a surface curved such that the ultrasonic wave generated from the ultrasonic wave generation source reaches the waveguide via the first reflection surface and the second reflection surface. The first reflection surface and the second reflection surface may be composed of a large number of minute flat surfaces.

(2) In each of the above embodiments, the ultrasonic wave generation source 11 is a piezoelectric element formed from a piezoelectric ceramic material. Without limitation thereto, another piezoelectric material can be used for the ultrasonic wave generation source. The ultrasonic wave generation source may be, for example, a laminated body of piezoelectric ceramic materials, or the like.

(3) In each of the above embodiments, when the introduction surface 19 is parallelly projected to the second reflection surface 17, the entire introduction surface 19 is located within the second reflection surface 17. Without limitation thereto, a portion of the introduction surface may protrude outward of the second reflection surface.

(4) In each of the above embodiments, each of the waveguide 13 and the ultrasonic wave condensation part 12 is solid. Without limitation thereto, the waveguide and the ultrasonic wave condensation part do not have to be solid. For example, through-holes or flow paths may be formed inside the waveguide and the ultrasonic wave condensation part. Specifically, the waveguide may have a tubular shape extending in the up-down direction. The ultrasonic wave condensation part may have a through-hole formed in the up-down direction so as to be in communication with the internal space of the waveguide.

(5) In each of the above embodiments, the ultrasonic wave condensation part 12 has the shape of a dome forming a portion of a sphere. Without limitation thereto, the ultrasonic wave condensation part may have a shape obtained by extending the shown cross-sectional shape in a direction orthogonal to the opposition direction in which the ultrasonic wave generation source and the first reflection surface are opposed to each other (for example, the backside direction of the drawing sheet).

(6) In each of the above embodiments, the waveguide 13 has a columnar shape extending upward along the axis A1. Without limitation thereto, the waveguide may have the shape of a wall obtained by extending the shown cross-sectional shape in the direction orthogonal to the opposition direction in which the ultrasonic wave generation source and the first reflection surface are opposed to each other (for example, the backside direction of the drawing sheet).

(7) In each of the above embodiments, the second reflection surface 17 is formed below the adhesion surface 18. Without limitation thereto, the second reflection surface may be recessed upward from the adhesion surface. In this case, the second reflection surface may be a paraboloid protruding to the upper side (first reflection surface side) as seen from outside of the ultrasonic wave condensation part. In this case as well, the ultrasonic wave generated from the ultrasonic wave generation source is reflected by the first reflection surface and the second reflection surface and introduced into the waveguide as a plane wave. In addition, in this case, the ultrasonic wave generation source may have the shape of a circular plate having no opening at a center portion thereof.

(8) In each of the above embodiments, the recessed portion 40 has an annular shape so as to extend along the outer circumferential surface 13B of the waveguide 13 and so as to be contiguous over the entire circumference. Without limitation thereto, the recessed portion may be a slit formed in a portion in the circumferential direction of the outer circumferential surface of the waveguide. In this case, a plurality of the recessed portions may be formed at a predetermined interval along the outer circumferential surface of the waveguide.

(9) In each of the above embodiments, the first surface 41 is a flat surface orthogonal to the axis A1. Without limitation thereto, the first surface may be tilted in the radial direction about the axis.

(10) In each of the above embodiments, the second surface 42 and the third surface 43 as seen from above have circular shapes that are concentric with the waveguide 13. Without limitation thereto, the shapes of the second surface and the third surface seen from above may be shapes different from that of the waveguide, and may be an approximately elliptical shape, an approximately rectangular shape, or the like.

(11) The second surface 42 and the third surface 43 in each of the above embodiments have linear shapes in the shown cross section. Without limitation thereto, the second surface and the third surface may be curved in the shown cross section.

(12) In the above embodiment 5, the waveguide 13 and the ultrasonic wave condensation part 12 may be fixed to each other by pressing such as press-fitting.

The disclosure has been described in detail with reference to the above embodiments. However, the disclosure should not be construed as being limited thereto. It should further be apparent to those skilled in the art that various changes in form and detail of the disclosure as shown and described above may be made. It is intended that such changes be included within the spirit and scope of the claims appended hereto.

This application claims priority to Japanese Patent Application Nos. JP 2022-172901 filed Oct. 28, 2023 and JP 2023-116713 filed Jul. 18, 2023, the respective disclosures of each of which are incorporated herein by reference in their entireties.

What is claimed is:

1. An ultrasonic wave generation device comprising:
    an ultrasonic wave generation source configured to generate an ultrasonic wave;
    an ultrasonic wave condensation part configured to condense the ultrasonic wave generated from the ultrasonic wave generation source; and
    a waveguide configured to allow transmission therethrough of the ultrasonic wave condensed by the ultrasonic wave condensation part, wherein
    the ultrasonic wave condensation part has a first reflection surface located to be opposed to the ultrasonic wave generation source and a second reflection surface located to be opposed to the first reflection surface,
    the first reflection surface reflects the ultrasonic wave, which has been generated from the ultrasonic wave generation source, toward the second reflection surface,
    the second reflection surface reflects the ultrasonic wave, which has been reflected by the first reflection surface, toward the waveguide so as to introduce the ultrasonic wave into the waveguide,
    the waveguide protrudes from the first reflection surface to a side opposite to the second reflection surface, and
    a recessed portion is formed to be recessed from the first reflection surface to the second reflection surface side along an outer circumferential surface of the waveguide.

2. The ultrasonic wave generation device according to claim 1, wherein
    the recessed portion is an air gap.

3. The ultrasonic wave generation device according to claim 1, wherein
the recessed portion is filled with a filler, and
an acoustic impedance of the filler differs from each of an acoustic impedance of the ultrasonic wave condensation part and an acoustic impedance of the waveguide.

4. The ultrasonic wave generation device according to claim 1, wherein
the waveguide and the ultrasonic wave condensation part are formed from a same material so as to be integrated with each other.

5. The ultrasonic wave generation device according to claim 1, wherein
the waveguide and the ultrasonic wave condensation part are formed as separate members and joined to each other, and
the recessed portion is formed between the waveguide and the ultrasonic wave condensation part which are joined to each other.

6. The ultrasonic wave generation device according to claim 1, wherein
the ultrasonic wave generation source has such a shape as to enclose a circumference of the second reflection surface, in a radial direction orthogonal to an opposition direction in which the ultrasonic wave generation source and the first reflection surface are opposed to each other, and
the recessed portion is located in a region on an inner circumferential side relative to a first region obtained by extending an inner circumferential edge of the ultrasonic wave generation source in the opposition direction.

* * * * *